US010471820B2

(12) United States Patent
Lahr et al.

(10) Patent No.: US 10,471,820 B2
(45) Date of Patent: Nov. 12, 2019

(54) HYBRID DRIVETRAIN

(71) Applicant: GM GLOBAL TECHNOLOGY OPERATIONS LLC, Detroit, MI (US)

(72) Inventors: Derek F. Lahr, Howell, MI (US);
Farzad Samie, Franklin, MI (US);
Norman K. Bucknor, Troy, MI (US);
Chunhao J. Lee, Troy, MI (US);
Dongxu Li, Troy, MI (US); Chandra S. Namuduri, Troy, MI (US);
Alexandru Rajala, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 250 days.

(21) Appl. No.: 15/583,383

(22) Filed: May 1, 2017

(65) Prior Publication Data
US 2017/0326964 A1 Nov. 16, 2017

Related U.S. Application Data

(60) Provisional application No. 62/335,973, filed on May 13, 2016.

(51) Int. Cl.
*B60K 6/48* (2007.10)
*B60K 6/36* (2007.10)
(Continued)

(52) U.S. Cl.
CPC ............. *B60K 6/48* (2013.01); *B60K 6/36* (2013.01); *B60K 6/38* (2013.01); *B60K 6/387* (2013.01);
(Continued)

(58) Field of Classification Search
CPC .... B60K 2006/4808; B60K 6/36; B60K 6/38; B60K 6/387; B60K 6/40; B60K 6/48; B60K 6/50; B60K 6/52; B60K 6/54; B60K 6/547
See application file for complete search history.

(56) References Cited

U.S. PATENT DOCUMENTS

2008/0185195 A1* 8/2008 Noiret ............... B60K 6/26
180/65.25
2009/0018716 A1* 1/2009 Ambrosio ............ B60K 6/48
701/22

(Continued)

FOREIGN PATENT DOCUMENTS

CN 1501568 A 6/2004
CN 1827412 A 9/2006
(Continued)

*Primary Examiner* — Jacob S. Scott
*Assistant Examiner* — Lori Wu
(74) *Attorney, Agent, or Firm* — Quinn IP Law

(57) ABSTRACT

A drivetrain system for a vehicle is described, and includes an internal combustion engine, a geartrain, an electric machine, a power take-off unit, and a driveline. The internal combustion engine is coupled to the geartrain via a disconnect clutch and a torque converter. The geartrain includes a transmission and a differential gearset, including an output member of the transmission coupled to an input member of the differential gearset. The input member of the differential gearset is coupled to a rotor of the electric machine and the power take-off unit. The differential gearset is coupled to first and second intermediate driveshaft members of the driveline to transfer propulsion power to vehicle wheels that are arranged in a front-wheel configuration.

18 Claims, 1 Drawing Sheet

(51) Int. Cl.
  *B60K 6/38*    (2007.10)
  *B60K 6/40*    (2007.10)
  *B60K 6/52*    (2007.10)
  *B60K 6/387*   (2007.10)
  *B60K 17/28*   (2006.01)
  *B60K 17/346*  (2006.01)
  *B60K 23/08*   (2006.01)

(52) U.S. Cl.
  CPC ............... *B60K 6/40* (2013.01); *B60K 6/52* (2013.01); *B60K 17/28* (2013.01); *B60K 17/346* (2013.01); *B60K 23/0808* (2013.01); B60K 2006/4808 (2013.01); B60K 2023/0833 (2013.01); B60Y 2200/92 (2013.01); B60Y 2400/82 (2013.01); Y02T 10/626 (2013.01); Y02T 10/6221 (2013.01)

(56) References Cited

U.S. PATENT DOCUMENTS

| | | | |
|---|---|---|---|
| 2013/0087425 A1* | 4/2013 | Frait | F16H 45/00 192/3.25 |
| 2015/0031501 A1* | 1/2015 | Tolkacz | B60K 6/442 477/5 |
| 2015/0360557 A1* | 12/2015 | Piazza | B60K 6/387 475/5 |
| 2016/0052382 A1* | 2/2016 | Clark | B60K 6/26 477/5 |
| 2017/0120899 A1* | 5/2017 | Sugimoto | B60K 6/36 |

FOREIGN PATENT DOCUMENTS

| | | |
|---|---|---|
| CN | 201240249 Y | 5/2009 |
| CN | 101492010 A | 7/2009 |
| CN | 101985273 A | 3/2011 |

* cited by examiner

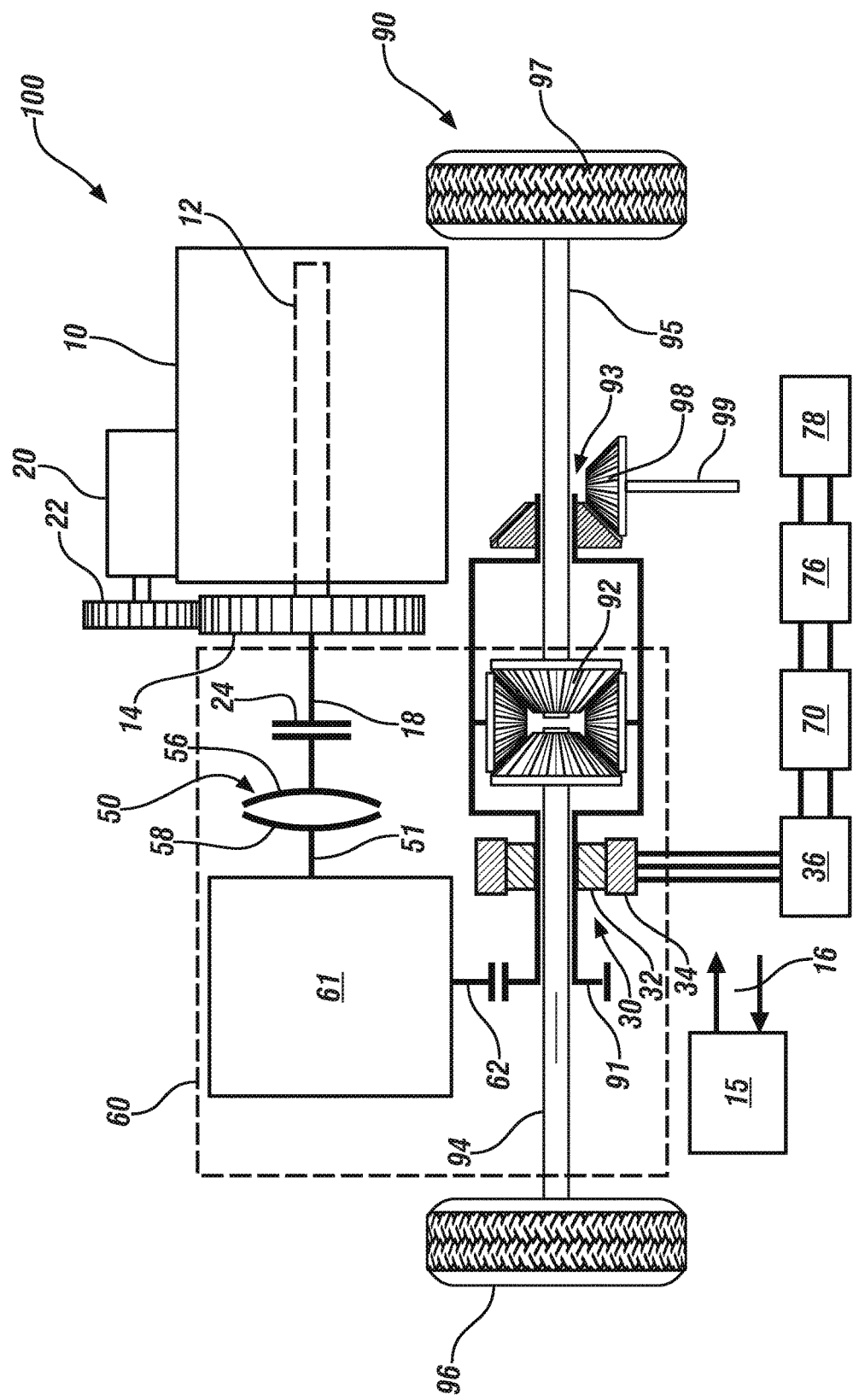

HYBRID DRIVETRAIN

CROSS-REFERENCE TO RELATED APPLICATIONS

This application claims the benefit of U.S. Provisional Patent Application No. 62/335,973, filed on May 13, 2016, the disclosure of which is hereby incorporated by reference.

BACKGROUND

Hybrid drivetrain systems can include internal combustion engines and electric motor/generators that are coupled to transmissions to transfer torque to a driveline for tractive effort. Known electric motor/generators are supplied electric power from energy storage systems. Powertrain systems for hybrid drivetrains may operate in various modes to generate and transfer propulsion power to vehicle wheels.

SUMMARY

A drivetrain system for a vehicle is described, and includes an internal combustion engine, a geartrain, an electric machine, a power take-off unit, and a driveline. The internal combustion engine is coupled to the geartrain via a disconnect clutch and a torque converter. The geartrain includes a transmission and a differential gearset, including an output member of the transmission coupled to an input member of the differential gearset. The input member of the differential gearset is coupled to a rotor of the electric machine and the power take-off unit. The differential gearset is coupled to first and second intermediate driveshaft members of the driveline to transfer propulsion power to vehicle wheels that are arranged in a front-wheel configuration.

An aspect of the disclosure includes the input member of the differential gearset being concentric to the first intermediate driveshaft member.

Another aspect of the disclosure includes the disconnect clutch being one of a one-way clutch, a selectable one-way clutch, or a friction clutch.

Another aspect of the disclosure includes the disconnect clutch being disposed between the internal combustion engine and the torque converter.

Another aspect of the disclosure includes the disconnect clutch being disposed between the torque converter and the transmission.

Another aspect of the disclosure includes a starter being rotatably coupled to the crankshaft via a flywheel.

Another aspect of the disclosure includes the input member of the differential gearset being coupled to the power take-off unit to transfer propulsion power to vehicle wheels disposed in a rear-wheel location.

Another aspect of the disclosure includes the input member of the differential gearset being coupled to the power take-off unit via a bevel gear arrangement.

Another aspect of the disclosure includes the electric machine being electrically connected to an inverter that is electrically connected to a DC power source, wherein the DC power source is configured at a nominal 48 Vdc voltage level.

Another aspect of the disclosure includes a controller that is operatively connected to the powertrain system, wherein the controller includes an instruction set that is executable to autostop the internal combustion engine and control operation of the electric machine in an electric-only drive mode to transfer propulsion power to the driveline.

Another aspect of the disclosure includes a controller that is operatively connected to the powertrain system, wherein the controller includes an instruction set that is executable to control operation of the drivetrain system in an engine/electric-assist drive mode to transfer propulsion power to the driveline.

Another aspect of the disclosure includes a controller that is operatively connected to the powertrain system, wherein the controller includes an instruction set that is executable to control operation of the drivetrain system in a regenerative mode to transfer propulsion power to the driveline.

Another aspect of the disclosure includes a controller that is operatively connected to the powertrain system, wherein the controller includes an instruction set that is executable to control operation of the drivetrain system in an engine-only drive mode to transfer propulsion power to the driveline.

Another aspect of the disclosure includes the input member of the differential gearset being coupled to the rotor of the electric machine via a motor disconnect clutch.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWING

One or more embodiments will now be described, by way of example, with reference to the accompanying FIGURE, which schematically illustrates a drivetrain system that includes an internal combustion engine that is coupled to a transmission, wherein the transmission is coupled to a driveline that includes an input member coupled to a differential gearset, wherein the input member of the driveline is coupled to the transmission, an electric machine and a power take-off unit, in accordance with the disclosure.

DETAILED DESCRIPTION

The components of the disclosed embodiments, as described and illustrated in the FIGURE herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is understood in the related art has not been described in detail in order to avoid unnecessarily obscuring the disclosure.

A hybrid drivetrain system 100 is schematically shown, and includes multiple torque-generating devices including an internal combustion engine (engine) 10 and at least one electrically-powered torque machine (electric machine) 30. The engine 10 is mechanically coupled to a geartrain 60 that includes a transmission 61 and a differential gearset 92, and the geartrain 60 and the electric machine 30 are mechanically coupled to a driveline 90 that includes first and second intermediate driveshaft members 94, 95 that are coupled to respective first and second vehicle wheels 96, 97. The geartrain 60 is configured to transfer mechanical power to a power take-off unit (PTU) 93. The concepts described herein may apply to any suitable drivetrain configuration that includes the internal combustion engine 10 and electric machine 30 configured to generate propulsion power that is transferred via the geartrain 60 and the driveline 90 to the vehicle wheels 96, 97 and coincidently transferred via the geartrain 60 to the PTU 93. Like numerals refer to like elements throughout the description. Operation of the drivetrain system 100 may be controlled by a controller 15, which is shown as a unitary device for ease of illustration. The drivetrain system 100 may be advantageously employed on a vehicle to provide propulsion power, and the vehicle may include, by way of non-limiting examples, a passenger vehicle, a light-duty or heavy-duty truck, a utility vehicle, an agricultural vehicle, an industrial/warehouse vehicle, or a recreational off-road vehicle.

The drivetrain system 100 is advantageously configured in a front-wheel drive arrangement to operate in one of multiple selectable modes, including, by way of non-limiting examples, an engine-only drive mode, an electric-only drive mode, a regenerative braking mode, and an engine/electric-assist mode. This configuration of the drivetrain system 100 further enables all-wheel drive (AWD) operation when an output member 99 of the PTU 93 is coupled to a second differential gearset (not shown) that is coupled to rear wheels (not shown). Alternatively, the drivetrain system 100 can be configured as a rear-wheel drive system. The drivetrain system 100 described herein advantageously employs the torque converter 50, which results in improved drivability. Furthermore, the drivetrain system 100 is configured to provide a hybrid propulsion system wherein the electric machine 30 is coupled to the geartrain 60 between the transmission 61 and the differential gearset 92. Furthermore, the hybrid components are able to make use of existing structural mounts and a power transmitting interface. Furthermore, the disconnect clutch 24 may be integrated into the housing of the torque converter 50, thus facilitating the regenerative braking mode and coasting, facilitating operation in the electric-only drive mode, and enhancing off-throttle coasting and sailing. In one embodiment (as shown), the disconnect clutch 24 is configured to couple the engine crankshaft 12 to a pump portion 56 of the torque converter 50 when activated. Alternatively (not shown), the disconnect clutch 24 may be configured to couple an impeller 58 of the torque converter 50 to an input member 51 to the transmission 61 when activated. Alternatively (not shown), the disconnect clutch may be configured to couple an intermediate gear (not shown) in the transmission 61 to an output member 62 of the transmission 61 when activated.

The engine 10 is preferably configured as a multi-cylinder internal combustion engine that converts fuel to mechanical torque through a thermodynamic combustion process. The engine 10 is equipped with a plurality of actuators and sensing devices for monitoring operation and delivering fuel to form in-cylinder combustion charges that generate an expansion force onto pistons, with such force transferred to a crankshaft 12 to produce torque. The engine 10 preferably includes a starter 20 that includes a starter switch and a starter gear 22, wherein the starter gear 22 meshingly engages gear teeth that are disposed on an outer circumference of a flywheel 14 that is coupled to the crankshaft 12 in one embodiment. The starter 20 is preferably configured as a single-phase electric motor including an output shaft that couples to the starter gear 22, wherein the single-phase electric motor is electrically connected to the low-voltage battery 78 via activation of the starter switch. In one embodiment, the starter gear 22 is permanently meshingly engaged with the flywheel 14. The flywheel 14 also couples to an input member 18 that is coupled via the disconnect clutch 24 to a pump portion 56 of the torque converter 50 in one embodiment. In one embodiment, the disconnect clutch 24 is a selectable one-way clutch. Alternatively, any suitable clutch arrangement can be employed. The actuators of the engine 10, including the starter switch are preferably controlled by an engine controller.

The engine 10 is preferably mechanized with suitable hardware and the engine controller preferably includes suitable control routines to execute autostart and autostop functions, fueled and fuel cutoff (FCO) functions, and all-cylinder and cylinder deactivation functions during ongoing operation of the drivetrain system 100. The engine 10 is considered to be in an OFF state when it is not rotating. The engine 10 is considered to be in an ON state when it is rotating. The all-cylinder state includes engine operation wherein all of the engine cylinders are activated by being fueled and fired. The cylinder deactivation state includes engine operation wherein one or a plurality of the engine cylinders are deactivated by being unfueled and unfired, and preferably operating with engine exhaust valves in open states to minimize pumping losses, while the remaining cylinders are fueled and fired and thus producing torque. The ON state may include operation in the FCO state in which the engine 10 is spinning and unfueled. The ON state may include operation in the cylinder deactivation state. The ON state may include operation in the FCO state in combination with the cylinder deactivation state. Engine mechanizations and control routines for executing autostart, autostop, FCO and cylinder deactivation control routines are understood and not described herein. Engine operation may be described in context of engine states, including an engine operation state, an engine fueling state and an engine cylinder state. The engine operation states preferably include the ON and the OFF state. The engine fueling states include the fueled state and the FCO state. The engine cylinder states include the all-cylinder state and the cylinder deactivation state.

The electric machine 30 is preferably a multi-phase electric motor/generator configured to convert stored electric energy to mechanical power and convert mechanical power to electric energy that may be stored in a DC power source (48V battery) 70. The 48V battery 70 is preferably configured at a nominal 48 volt-DC (Vdc) voltage level. The electric machine 30 preferably includes a rotor 32 and a stator 34, and electrically connects via the inverter module 36 to the 48V battery 70. The rotor 32 couples to an input member 91 of the differential gearset 92. In one embodiment, the rotor 32 couples to the input member 91 of the differential gearset 92 via an interposed motor disconnect clutch (not shown). The motor disconnect clutch may be employed in systems to manage a speed ratio between the electric machine 30 and the input member 91, including permitting disconnection of the rotor 32 from the input member 91 under conditions when the speed of the input member 91 exceeds the rated speed of the electric machine 30. Alternatively, another non-combustion torque machine, such as a pneumatically-powered device or a hydraulically-powered device may be employed in place of the electric machine 30. By way of definition, a non-combustion torque machine is any device capable of generating torque by converting a potential energy source to kinetic energy without combustion of the potential energy. Non-limiting examples of the potential energy source may include electric energy, pneumatic energy and hydraulic energy. Pneumatically-powered devices and hydraulically-powered devices are understood and not described in detail herein.

The torque converter 50 is a rotatable torque coupling device arranged between the input member 18 of the engine 10 and an input member 51 of the transmission 61. The torque converter 50 preferably includes a pump 56 rotatably coupled to the crankshaft 12, a stator element (not shown), an impeller 58 rotatably coupled to the input member 51 to the transmission 61, and a controllable clutch (not shown). The torque converter 50 operates to provide fluid torque coupling between the pump 56 and the impeller 58 when the torque converter clutch is deactivated or released, and provides mechanical torque coupling between the pump 56 and the impeller 58 when the torque converter clutch is activated.

The transmission 61 may be arranged in a step-gear configuration in one embodiment, and may include one or more differential gear sets and activatable clutches configured to effect torque transfer in one of a plurality of fixed gear states over a range of speed ratios between the engine 10, the input member 51 and the output member 62. The transmission 61 may include a first rotational speed sensor in the form of a Hall-effect sensor or another suitable sensor that may be configured to monitor rotational speed of the input member 51 and/or a second rotational speed sensor that may be configured to monitor rotational speed of the output member 62. The transmission 61 includes any suitable configuration, and may be an automatic transmission that automatically shifts between the fixed gear states to operate at a gear ratio that achieves a preferred match between an output torque request and an engine operating point. The transmission 61 automatically executes upshifts to shift to a gear state having a lower numerical multiplication ratio (gear ratio) at preset speed/load points and executes downshifts to shift to a gear state having a higher numerical multiplication ratio at preset speed/load points. The transmission 61 may be controlled using a controllable hydraulic circuit that communicates with a transmission controller, which may be integrated into or separate from the controller 15. The transmission controller preferably controls the torque converter clutch. The transmission 61 executes upshifts to shift to a fixed gear that has a lower numerical multiplication ratio (gear ratio) and executes downshifts to shift to a fixed gear that has a higher numerical multiplication ratio. A transmission upshift may require a reduction in engine speed so the engine speed matches transmission output speed multiplied by the gear ratio at a gear ratio associated with a target gear state. A transmission downshift may require an increase in engine speed so the engine speed matches transmission output speed multiplied by the gear ratio at a gear ratio associated with the target gear state. Designs of transmissions and transmission shifting are understood and not described in detail herein. Transmission operation may be described in context of a control variable that may be communicated to the transmission 61 that is related to a selected fixed gear state. The output member 62 of the transmission 61 is rotatably coupled to the input member 91 of the differential gearset 92 via a chain drive mechanism, a meshed gearset, or another suitable torque transmission configuration.

The driveline 90 is disposed to transfer propulsion power output from the transmission 61 to first and second vehicle wheels 96, 97 via respective first and second intermediate driveshaft members 94, 95, which are coupled to the differential gearset 92. The driveline 90 is disposed in a front-wheel configuration in one embodiment. The input member 91 is coupled to the rotor 32 of the electric machine 30. One of the first and second intermediate driveshaft members 94, 95, e.g., the second intermediate driveshaft member 95 is coupled to the PTU 93 as shown. The PTU 93 preferably includes a bevel gear configuration 98 that is capable of transferring torque to the output member 99. The driveline 90 is configured to transfer tractive power between the output member 62 of the transmission 61, the electric machine 30 and a road surface via the wheels 96, 97. The driveline 90 may be configured to transfer tractive power between the output member 62 of the transmission 61, the electric machine 30, the PTU 93, and a road surface via the wheels 96, 97 and a second set of vehicle wheels located in a rear position (not shown) when the PTU 93 is coupled to the second set of vehicle wheels. The drivetrain system 100 is illustrative, and the concepts described herein apply to other drivetrain systems that are similarly configured.

The inverter module 36 is configured with suitable control circuits including power transistors, e.g., integrated gate bipolar transistors (IGBTs) for transforming DC electric power to AC electric power and transforming AC electric power to DC electric power. The inverter module 36 preferably employs pulsewidth-modulating (PWM) control of the IGBTs to convert stored DC electric power originating in the 48V battery 70 to AC electric power to drive the electric machine 30 to generate torque. Similarly, the inverter module 36 converts mechanical power transferred to the electric machine 30 to DC electric power to generate electric energy that is storable in the 48V battery 70, including as part of a regenerative braking control strategy. The inverter module 36 receives motor control commands from the controller 15 and controls inverter states to provide a desired motor drive operation or a regenerative braking operation. In one embodiment, an auxiliary DC/DC electric power converter 76 electrically connects to a low-voltage electric power bus and provides electric power to charge the low-voltage battery 78 via a low-voltage electric power bus. Such electric power connections are understood and not described in detail. The low-voltage battery 78 provides low-voltage electric power to low-voltage systems on the drivetrain system 100 and the vehicle, including, e.g., the starter 20, electric windows, HVAC fans, seats, and other devices. In one embodiment the low-voltage battery 78 is configured to operate at a nominal 12 Vdc voltage level.

The 48V battery 70 is preferably disposed to supply electric power at a nominal voltage level of 48 Vdc, and may be any DC power source, e.g., a multi-cell lithium ion device, an ultra-capacitor or another suitable device without limitation. Monitored parameters related to the 48V battery 70 preferably include a state of charge (SOC), temperature and others. In one embodiment, the 48V battery 70 may electrically connect via an on-vehicle battery charger to a remote, off-vehicle electric power source for charging while the vehicle is stationary.

The controller 15 may signally connect to an operator interface (not shown), and operates to provide hierarchical control of a plurality of control devices to effect operational control of individual elements of the drivetrain system 100, including, e.g., the inverter module 36, the engine controller and the transmission controller. The controller 15 communicates with each of the inverter module 36, the engine controller and the transmission controller, either directly or via a communications bus 16 to monitor operation and control operations thereof.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

Vehicle operation responsive to operator requests includes operating modes of acceleration, braking, steady-state running, coasting, and idling. The acceleration mode includes an operator request to increase vehicle speed. The braking mode includes an operator request to decrease vehicle speed. The steady-state running mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The coasting mode includes vehicle operation wherein vehicle speed is above a minimum threshold speed and the operator request to the accelerator pedal is at a point that is less than required to maintain the present vehicle speed. The idle mode includes vehicle operation wherein vehicle speed is at or near zero.

The drivetrain system 100 is operative in one of a plurality of modes, which may be selected and implemented during ongoing drivetrain operation to effect vehicle operations of acceleration, braking, steady-state running, coasting, and idling. The drivetrain modes include the engine-only drive mode, an electric-only drive mode, a regenerative mode, and an engine/electric-assist drive mode, with accompanying engine autostart/autostop operations. In the engine-only drive mode, the engine 10 is controlled to generate propulsion power while the electric machine 30 freewheels. This mode may be commanded during vehicle acceleration or steady-state running. In the electric-only drive mode, the electric machine 30 is controlled as a motor to generate propulsion power, while the engine 10 in the OFF state and disconnected by action of the disconnect clutch 24. This mode may be commanded during idle, vehicle acceleration or steady-state running. In the regenerative mode, the electric machine 30 is controlled as a generator to react driveline torque and generate electric power, while the engine 10 either at idle or in the OFF state and disconnected by action of the disconnect clutch 24. This mode may be commanded during coasting and vehicle braking. In the engine/electric-assist drive mode, the engine 10 and the electric machine 30 are controlled to generate propulsion power. This mode may be commanded during vehicle acceleration or steady-state running.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A drivetrain system for a vehicle, comprising:
an internal combustion engine, a geartrain, an electric machine, a power take-off unit, a driveline, and a starter rotatably coupled to a crankshaft of the internal combustion engine via a flywheel;
wherein the internal combustion engine is coupled to the geartrain via a disconnect clutch and a torque converter;
wherein the geartrain includes a transmission and a differential gearset, including an output member of the transmission coupled to an input member of the differential gearset;
wherein the input member of the differential gearset is coupled to a rotor of the electric machine and the power take-off unit; and
wherein the differential gearset is coupled to first and second intermediate driveshaft members of the driveline to transfer propulsion power to vehicle wheels that are arranged in a front-wheel configuration.

2. The drivetrain system of claim 1, wherein the input member of the differential gearset is concentric to the first intermediate driveshaft member.

3. The drivetrain system of claim 1, wherein the disconnect clutch comprises one of a one-way clutch, a selectable one-way clutch, or a friction clutch.

4. The drivetrain system of claim 1, wherein the disconnect clutch is disposed between the internal combustion engine and the torque converter.

5. The drivetrain system of claim 1, wherein the disconnect clutch is disposed between the torque converter and the transmission.

6. The drivetrain system of claim 1, wherein the input member of the differential gearset is coupled to the power take-off unit that includes a bevel gear arrangement.

7. The drivetrain system of claim 1, further comprising the electric machine electrically connected to an inverter electrically connected to a DC power source, wherein the DC power source is configured at a nominal 48 Vdc voltage level.

8. The drivetrain system of claim 1, further comprising a controller operatively connected to the internal combustion engine and the electric machine, the controller including an instruction set, the instruction set being executable to autostop the internal combustion engine and control operation of the electric machine in an electric-only drive mode to transfer propulsion power to the driveline.

9. The drivetrain system of claim 1, further comprising a controller operatively connected to the internal combustion engine and the electric machine, the controller including an instruction set, the instruction set being executable to control operation of the drivetrain system in an engine/electric-assist drive mode to transfer propulsion power to the driveline.

10. The drivetrain system of claim 1, further comprising a controller operatively connected to the internal combustion engine and the electric machine, the controller including an instruction set, the instruction set being executable to control operation of the drivetrain system in a regenerative mode to transfer power from the driveline.

11. The drivetrain system of claim 1, further comprising a controller operatively connected to the internal combustion engine and the electric machine, the controller including an instruction set, the instruction set being executable to control operation of the drivetrain system in an engine-only drive mode to transfer propulsion power to the driveline.

12. A drivetrain system for a vehicle, comprising:
an internal combustion engine, a geartrain, an electric machine, a power take-off unit, and a driveline;
wherein the internal combustion engine is coupled to the geartrain via a disconnect clutch and a torque converter;
wherein the geartrain includes a transmission and a differential gearset, including an output member of the transmission coupled to an input member of the differential gearset;
wherein the input member of the differential gearset is coupled to a rotor of the electric machine and the power take-off unit; and
wherein the differential gearset is coupled to first and second intermediate driveshaft members of the driveline to transfer propulsion power to vehicle wheels that are arranged in a front-wheel configuration; and
wherein the input member of the differential gearset is coupled to the power take-off unit to transfer propulsion power to vehicle wheels disposed in a rear-wheel location.

13. A drivetrain system for a vehicle, comprising:
an internal combustion engine and an electric machine being coupled to a geartrain that is coupled to a driveline;
the geartrain including a torque converter, a transmission, a differential gearset, and a disconnect clutch, wherein the torque converter is coupled to an input member of the transmission;
the driveline including first and second intermediate driveshaft members coupled to vehicle wheels disposed in a front-wheel drive configuration, wherein the first and second intermediate driveshaft members are coupled to the differential gearset;
wherein the internal combustion engine includes a crankshaft that is coupled to the torque converter and a starter rotatably coupled to the crankshaft of the internal combustion engine via a flywheel,
wherein the disconnect clutch is disposed to disconnect an element of the geartrain from the driveline;
wherein the differential gearset includes an input member;
wherein the input member of the differential gearset is coupled to a power take-off unit; and
wherein the input member of the differential gearset is coupled to an output member of the transmission and a rotor of the electric machine.

14. The drivetrain system of claim 13, wherein the disconnect clutch is disposed between the internal combustion engine and the torque converter.

15. The drivetrain system of claim 13, wherein the disconnect clutch is disposed between the torque converter and the transmission.

16. The drivetrain system of claim 13, wherein the disconnect clutch is disposed between the transmission and the differential gearset.

17. The drivetrain system of claim 13, wherein:
the differential gearset is coupled to the driveline, and
the input member of the differential is concentric to the first intermediate driveshaft member.

18. The drivetrain system of claim 13, wherein the input member of the differential gearset is coupled to the rotor of the electric machine via a motor disconnect clutch.

* * * * *